United States Patent [19]
Heimberger

[11] Patent Number: 6,012,702
[45] Date of Patent: Jan. 11, 2000

[54] DISASSEMBLABLE COCK

[75] Inventor: Rudolf Heimberger, Oberderdingen, Germany

[73] Assignee: Richard Wolf GmbH, Knittlingen, Germany

[21] Appl. No.: 09/035,583

[22] Filed: Mar. 5, 1998

[30] Foreign Application Priority Data

May 3, 1997 [DE] Germany .............. 197 08 884

[51] Int. Cl.⁷ .................................................. F16K 5/02
[52] U.S. Cl. .......................... 251/309; 251/904; 137/240
[58] Field of Search .................................. 137/242, 330, 137/238, 240; 251/181, 309, 904

[56] References Cited

U.S. PATENT DOCUMENTS

| | | | |
|---|---|---|---|
| 2,628,059 | 2/1953 | Hinrichs | 137/330 X |
| 3,012,752 | 12/1961 | Buck | 251/904 X |
| 3,093,358 | 6/1963 | Wakeman | 251/181 X |
| 3,195,856 | 7/1965 | Arrison | 251/181 |
| 3,779,513 | 12/1973 | Levine . | |
| 3,788,599 | 1/1974 | Cloyd . | |
| 3,788,602 | 1/1974 | Kitzie . | |

FOREIGN PATENT DOCUMENTS

| | | | |
|---|---|---|---|
| 733 836 | 9/1996 | European Pat. Off. . | |
| 1 261 017 | 4/1961 | France | 251/181 |
| 1 149 213 | 5/1963 | Germany . | |
| 42 26 770 | 5/1994 | Germany . | |
| 295 02 279 | 5/1995 | Germany . | |

*Primary Examiner*—John Fox
*Attorney, Agent, or Firm*—Cohen, Pontani, Lieberman & Pavane

[57] ABSTRACT

The invention relates to a disassemblable cock with which a plug rotatable in the cock housing is releasably latched with the housing. The plug can be moved by tension or pressure from a working position into an intermediate position in which the sealing surfaces of the plug and of the cock housing are located out of bearing yet the plug remains connected to the housing (FIG. 1).

12 Claims, 2 Drawing Sheets

DISASSEMBLABLE COCK

BACKGROUND OF THE INVENTION

The invention relates to a cock with a housing and a plug rotatable in the housing, the plug in its working position bearing with sealing surfaces against sealing surfaces of the housing, and on releasing its detachable connection with the housing can be brought from the working position into an intermediate position in which the sealing surfaces are located out of bearing and the housing as well as the cock remain connected.

Such a disassemblable cock is known from the German utility model 295 02 279.5. With this known cock there is inserted through the lower part of the plug a transversely lying locking bolt which with its ends projects beyond the circumference of the lower part of the plug. Transversely to the passage channel and to the axis of the plug, at least one transverse slot is made in the cock housing as a relief which points upwards in the direction of the grip and projects into an extending end of the locking bolt. With this the transverse slot or slots end within the housing below the remaining housing part which forms the upper stop for one bolt end. In this manner the individual parts of the cock, on disassembly for the purpose of cleaning, are connected to one another securely against loss. With this cock of the known constructional type it is a disadvantage that relatively many parts and various materials are required so that it can only be manufactured relatively complicatedly and expensively.

Particularly in the biological/medical field it must be taken care that a cock which may be employed in many ways may be easily disassembled for cleaning by rinsing and for disinfecting, wherein however the parts should remain with one another, and that it may be manufactured from few parts and with a low expense.

BRIEF SUMMARY OF THE INVENTION

It is therefore the object of the invention to provide a disassemblable cock, in particular suitable for biological/medical applications, which with few parts and with the use of as few different materials as possible can be cheaply manufactured such that it is also only partly disassemblable and that in this condition the individual parts remain connected to one another but still may be excellently cleaned and disinfected.

A disassemblable cock of the previously mentioned type which achieves the above object is, according to the invention, characterized in that the plug in the working position is latched with the housing with a positive and friction fit and when this latching is overcome can be moved into an intermediate position suitable for rinsing and disinfecting.

By way of the forming of the plug of the cock according to the invention and by way of the flexible latching with the complementary latching means on the cock housing the cock may be assembled and disassembled in the simplest of manners. The number of individual parts of the cock according to the invention is esssentailly reduced to two to three parts. Preferably the plug is designed as an injection part, by which means firstly an optimal material combination may be achieved and secondly the snap locking may be achieved without great effort. An lock washer in particular consisting of stainless steel or a nickel titanium alloy or also of elastomers may in one embodiment type effect the elastic latching between the plug and the cock housing.

By way of a two-stepped flexible latching it is possible apart from the working position, only by way of latching to achieve a cleaning position as an intermediate position. The gap arising in the intermediate position between the sealing surfaces of the plug and the cock housing is adequate for disinfection or rinsing, and permits the action of the rinsing or disinfection means on the sealing surfaces without the cock having to be completely disassembled.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

By way of the accompanying drawing, hereinafter a few embodiment examples of the cock according to the invention are described. There are shown.

DETAILED DESCRIPTION OF THE PREFERRED EMBODIMENTS

Figure 1:
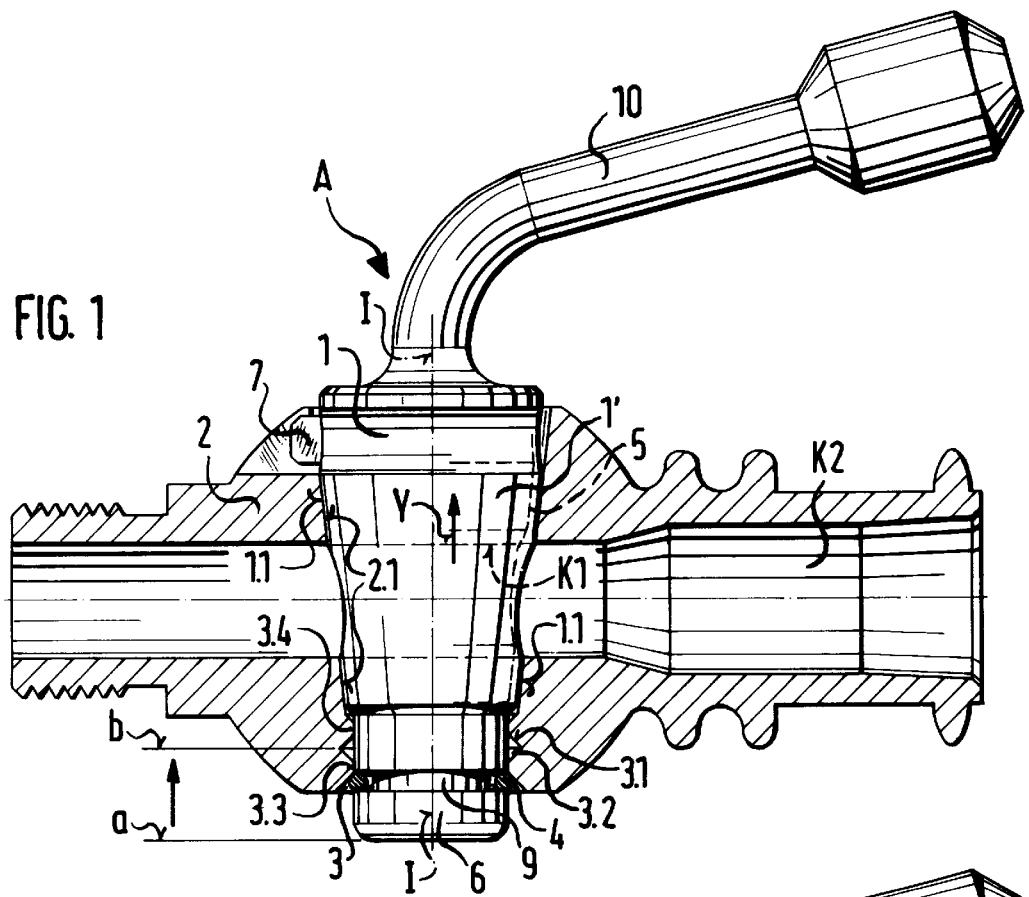
FIG. 1 schematically a part section of a first embodiment form of a disassemblable cock, FIG. 2 a particular embodiment of the invention with which the movement of the plug of the cock from the working position into the intermediate position is posssible by mechanical means, FIG. 3 in a schematical part cross section, a second embodiment form of a disassemblable cock according to the invention, which makes do with only two parts and FIG. 4 a longitudinal section through a disassemblable cock of a third embodiment form of the invention.

With the first embodiment form of the invention shown in FIG. 1 and indicated with the letter A, the cock plug 1 tapering downwards and shaped essentially conically is seated in a complementarily formed receiver of the cock housing 2. The receiver of the housing 2 and the plug 1 lie in the shown working or operating position in the manner known per se with sealing surfaces 1.1 and 2.1 bearing against one another. On the periphery of the lower end 6 of the plug 1 and on the lower end of the housing 2, in each case there are provided complementary first and second latching means 3, 3.1, 3.2 and 4 which can be brought into engagement with a positive or friction fit. The housing 2 comprises two parallel annular shoulders 3 and 3.1 which are separated from one another by an annular groove 3.2 with a projection 3.3 aligned inwardly towards the axis I—I. The plug 1 has at its lower end 6 an annular groove 9 in which a lock washer 4 lies.

On inserting the plug 1 into the cock housing 2 the lock washer 4 under elastic deformation is pressed over an annular projection 3.4 of the housing 2 forming the inner annular shoulder 3.1, wherein the lock washer 4 firstly snaps into the annular groove 3.2 of the housing 2 (intermediate position b). When then further pressure is exerted from above on the plug 1, the lock washer 4 snaps over the annular projection 3.3 of the cock housing 2, forming the outer annular shoulder 3, and then bears on this annular shoulder 3. The plug is then seated in its working position a in the housing 2.

By way of an oppositely directed pressure in the direction Y on the lower end 6 of the plug 1 or by pulling in the direction Y at the upper end of the plug 1, this plug may again be brought into the intermediate position b with steps progressing reversely than on assembly, with this intermediate position an annular space 5 is located between the partly shown cock plug 1 indicated partly dashed and the cone receiver of the housing 2, with disinfection and rinsing means being able to freely flow through this annular space.

If one again exerts pressure on the lower end 6 of the plug 1 in the previously mentioned intermediate position in the direction Y, then the plug 1, after the lock washer 4 runs over the housing projection 3.4 carrying the annular shoulder 3.1 under elastic deformation, is released and may be completely pulled or pushed out of the cone receiver of the cock housing 2.

Above, on the plug 1 there sits an operating lever 10 with which the plug may be rotated about its axis I—I by hand in order to be able to bring its passage K1 in the usual manner to a greater or lesser width overlapping the passage channel K2 in the cock housing 2. For completely blocking of course the passage K1 in the plug of the cock is completely brought out of the overlapping with the channel K2.

Figure 2:
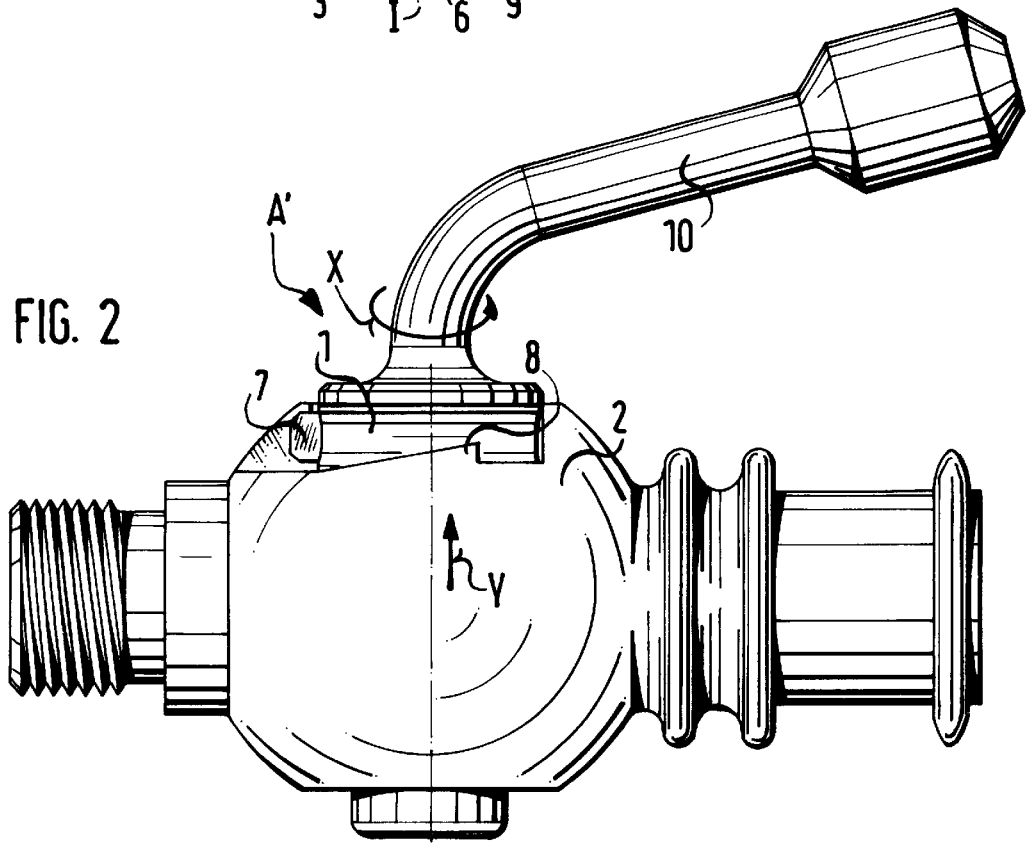

The reaching of the intermediate position b or the removal of the cock plug 1 out of the cone receiver of the cock housing 2 may also be realized in that, as the embodiment form A' in FIG. 2 shows, a pin or lug 7 limiting the rotational movement X of the cock plug, after overcoming a certain pivoting angle, runs onto a ramp-shaped projection 8, by which means the cock plug 1 is displaced axially in the direction of the arrow Y, wherein the lock washer 4 under deformation overcomes the annular shoulder 3 and comes to lie in the annular groove 3.2 defining the intermediate position b and this intermediate position, indicated partly and dashed in FIG. 1, is reached whilst forming an annular space 5 (FIG. 9) between the cock plug 1 and the cock housing 2.

With the embodiment forms A and A' shown in FIGS. 1 and 2 the cock consists of only three individual parts, that is the plug 1, the cock housing 2 and the lock washer 4. The lock washer 4 may be manufactured from a non-rusting spring steel or a non-ferrous metal. It may however also consist of an elastomer ring. The cock plug 1 may usefully be manufactured as an injection part which keeps the manufacturing costs low.

Figure 3:
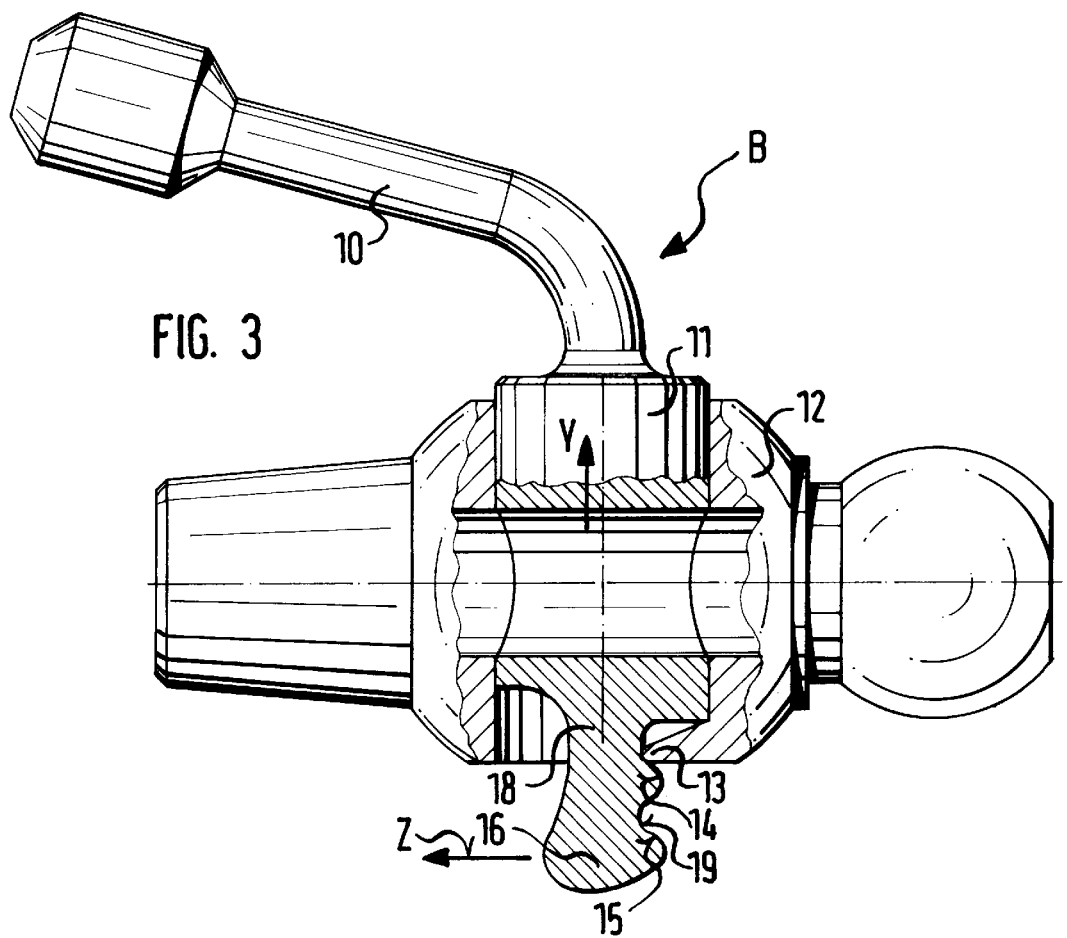

FIG. 3 shows an alternative embodiment form indicated at B, of a cock according to the invention, which makes do with only two individual parts. The lower end of the cock plug 11, which lies opposite the operating lever 10, has an extension 16 which is deflectable in a spring manner radially to the rotational axis of the cock plug in the direction of arrow Z, and which protrudes essentially centrally and in the axial direction. The elastic property of this extension 16 in the Z-direction is made possible by a tapered section 18 connecting upwardly.

On the extension 16 a first latching shoulder 14 and a second latching shoulder 15 are formed, and in the working position shown in FIG. 3 a complementarily formed, inwardly protruding projection 13 of the cock housing 12 engages on the first latching shoulder 14 of the cock plug 11. If the cock plug 11 on the lever 10 is pulled upwards, i.e. in the direction Y, or pressure is exerted onto the axial projection 16 of the cock plug 11 in the Y-direction, or if alternatively the axial extension 16 is bent off by hand in the Z-direction and the cock plug is pulled, the projection 13 of the cock housing 12 will finally slide into the indentation 19 between the latching shoulders 14 and 15, so that the cock plug 11 whilst forming a free annular space, comparable to the annular space 5 in FIG. 1, assumes an intermediate position, not shown in FIG. 3, between the plug 11 and the cock housing 12, in which the partly disassembled cock is rinsed, whilst the two parts 11 and 12 still remain unlosably connected.

Only if further tension or pressure is exerted on the plug 11 in the Y-direction does the latching shoulder 15 under elastic deflection of the extension 16 in the direction Z, pass over the projection 13, so that the cock plug 11 can be freely and completely pulled from the housing 12. Also with the embodiment form B shown in FIG. 3 the cock plug may advantageously be manufactured from an injection part of biocompatible plastic, e.g. from Teflon.

Subsequently there is described with reference to FIG. 4 a further embodiment form of a cock according to the invention, which is indicated at C. The cone surfaces of the cock plug 21 and the cock housing 22, also forming the sealing surfaces, run reversely compared to the embodiment forms A, A' and B shown in FIGS. 1 to 3, i.e. they increase in diameter from the upper end of the plug 21, comprising a rotating member 20, towards the lower end of the plug. The cock plug 21 may be axially symmetrical with respect to its axis of rotation I—I. The rotating member 20 on the upper end of the cock may be formed as an extension of the plug 21 and provided with a slot for a screw driver.

Figure 4:
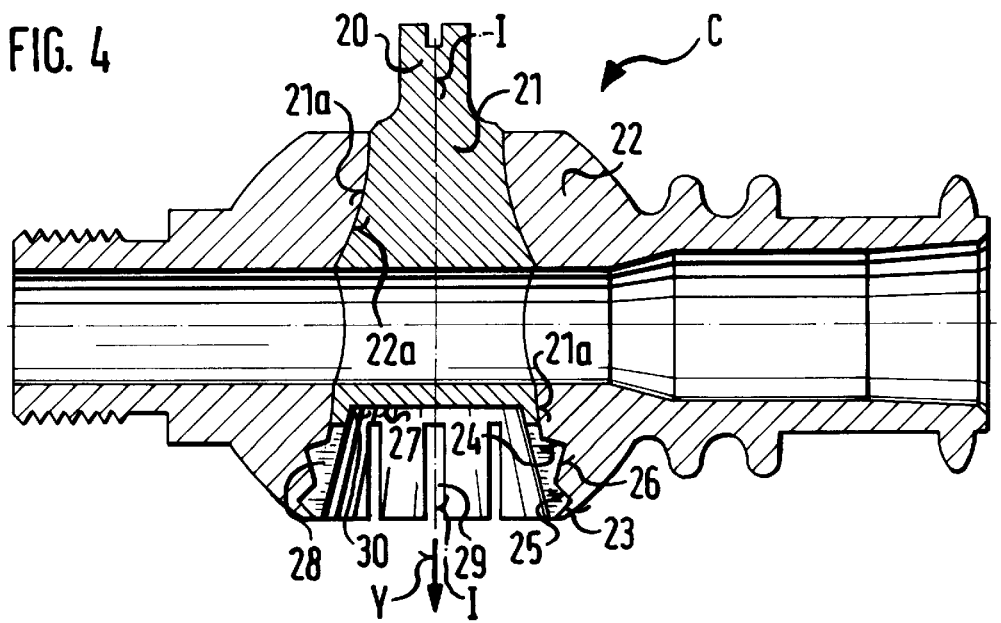

In the working position shown in FIG. 4, the cock plug 21 with its scaling surfaces 21a, rests snugly and rotatably against the sealing surfaces 22a in the receiver of the cock housing 22. The conically extending lower end of the cock plug 21, lying opposite to the rotating member 20, has a central bore or hollow 27 so that there arises a wall part 28 flexible in the radial direction. The flexibility is in particular achieved by a tapered wall section 30 in the region of the floor of the hollow 27. The outer periphery of this annular flexible wall section 28 comprises two concentric and parallely formed annular shoulders 24 and 25 which in the working position of the cock shown in FIG. 4 rest on complementarily formed annular shoulders 26, 23 of the cock housing 22.

If pressure or tension is exerted on the cock plug 21 in the direction of the arrow Y, on overcoming the spring force of the therewith elastically outwardly deflected wall section 28, it is displaced from the working position shown, into an intermediate position not shown in FIG. 4, in which the annular shoulder 24 of the cock plug 21 bears on the annular shoulder 23 of the cock housing 22 and the sealing surfaces 22a, 21a on the housing and cock plug are located out of bearing and therefore there has arisen an annular space between the cock plug 21 and the cock housing 22 adequate for rinsing or disinfecting. When further pressure is exerted on the cock plug 21 in the direction of the arrow Y the annular shoulder 24 of the cock plug 21 also comes free from the annular shoulder 23 of the cock housing 22, and the cock plug 21 may be completely taken out of the cock housing 21.

In order to improve the spring effect of the annular flexible wall section 28 of the cock plug 21 this wall section 28 in the circumferential direction may have uniformly spaced radially guided incisions 29 which divide the wall section 28 into individual flexible segments which connect on the floor of the hollow 27 forming the annular wall section 28. It must still be mentioned that in FIG. 4 the conicity of the cock plug 21 and of the receiver of the housing 22 and also the size of the annular shoulders 23–26, forming the latching means on the housing 22 and the cock plug 21 are shown exaggerated in size for illustration.

Also the axially symmetrically formed plug of the embodiment form C according to FIG. 4 may be manufactured as an injection part, e.g. using an elastomer. Furthermore in this case too the cock consists of only two individual parts, that is the plug 21 and the cock housing 22.

Of particular importance with all embodiment forms is that the respective latching means are designed and operate such that with the cock plug located in the working position, they hold the sealing surfaces of the cock plug always in snug contact with the sealing surfaces in the receiver of the cock housing, and that for this purpose therefore no additional holding or spring means are required.

I claim:

1. A cock comprising:

a housing having a first sealing surface; and a plug having a second sealing surface and a longitudinal axis, the plug being detachably mounted at least partially within said housing so as to be movable in an axial direction between a working position and an intermediate rest position, said plug further comprising means for releasably connecting said plug to said housing in a positive and friction fit when said plug is in the working position and in the intermediate rest position so that said plug maintains the position it is in, wherein when said plug is in the working position said first and second sealing surfaces are in contact forming a seal therebetween, and when said plug is in the intermediate rest position said first and second sealing surfaces are not in contact to facilitate rinsing and disinfection of said housing and said cock, said plug being movable out of both of said positions by overcoming the positive and friction fit.

2. The cock according to claim 1, wherein said plug is formed conically, said plug further comprising a plug end having a periphery, the connecting means including first latching means positioned in said periphery, the plug having an insert section configured for insertion into said housing, said insert section being formed substantially axially symmetrically; and forming the second sealing surface and said housing further comprising a conical receiver which forms the first sealing surface and is formed complementary to said insert section for receiving said insert section, the connecting means further including second latching means provided in the conical receiver for engaging said first latching means when said insert section is inserted into said conical receiver and moved into the working position and the intermediate position to form a positive fit therebetween in both positions.

3. The cock according to claim 2, wherein said plug comprises a rotating member, and wherein:

said first latching means comprise an annular groove defined on a portion of said plug end opposite to said rotating member, and a lock washer having an outer periphery and positioned elastically compressable in said annular groove such that said outer periphery of said lock washer extends at least partially beyond said periphery area of said plug end; and said second latching means comprise a first annular shoulder defined in said housing and configured to receive at least a portion of said lock washer when said plug is in the working position.

4. The cock according to claim 3, wherein said second latching means further comprise a second annular shoulder defined in said housing parallel and concentric to said first annular shoulder, and an annular groove defined parallel and concentrically between said first and second annular shoulders, such that when said plug is in the intermediate position, said lock washer is positioned in said annular groove and contacts said second annular shoulder.

5. The cock according to claim 1, wherein said plug is movable between the working position and the intermediate position when a tension or pressure force is exerted on said plug in a predetermined direction.

6. The cock according to claim 5, wherein said housing further comprises an internal relief portion having a plurality of annular sections, and a ramp-shaped projection, and wherein said plug further comprises a lug for engaging said relief portion of said housing so as to limit a rotational movement of said plug within said housing, such that when said plug, is rotated and after a predetermined rotational angle is exceeded, said lug contacts said ramp-shaped projection so that when rotation of said plug is continued, said plug is moved in said predetermined direction to bring said plug into the intermediate position.

7. The cock according to claim 6, wherein said lock washer is composed of stainless spring steel.

8. The cock according to claim 6, wherein said lock washer is composed of a nickel titanium alloy.

9. The cock according to claim 2, wherein said first latching means comprise an end section laterally deflectable in a spring manner, having parallel shoulders.

10. The cock according to claim 9, wherein said second latching means comprises a projection.

11. The cock according to claim 10, wherein said plug end is configured in a radially springable manner, wherein said plug end comprises a flexible peripheral annular wall having an outer periphery area, and wherein at least one of said parallel shoulders is positioned around said outer periphery area of said annular wall.

12. The cock according to claim 11, wherein said annular wall comprises radial incisions uniformly spaced in a circumferential direction.

* * * * *